June 23, 1964 J. S. KILBY 3,138,721

MINIATURE SEMICONDUCTOR NETWORK DIODE AND GATE

Filed May 6, 1959

INVENTOR

Jack S. Kilby

BY

Stevens, Davis, Miller & Mosher

ATTORNEYS

United States Patent Office 3,138,721

Patented June 23, 1964

3,138,721

MINIATURE SEMICONDUCTOR NETWORK DIODE AND GATE

Jack S. Kilby, Dallas, Tex., assignor to Texas Instruments Incorporated, Dallas, Tex., a corporation of Delaware Filed May 6, 1959, Ser. No. 811,372
3 Claims. (Cl. 307—88.5)

This invention relates broadly to miniature semiconductor networks and more particularly to a diode AND gate in the form of an integrated semiconductor device.

Many methods and techniques for miniaturizing electronic circuits have been proposed in the past. At first, most of the effort was spent upon reducing the size of the components and packing them more closely together. Work directed toward reducing component size is still going on, but has nearly reached a limit. Other efforts have been made to reduce the size of electronic circuits, such as by eliminating the protective coverings from components, by using more or less conventional techniques to form components of a complete circuit on a single substrate, and by providing the components with a uniform size and shape to permit closer spacings in the circuit packaging therefor.

All of these methods and techniques require a very large number and variety of operations in fabricating a complete circuit. For example, of all circuit components, resistors are usually considered the most simple to form, but when adapted for miniaturization by conventional techniques, fabrication requires at least the following steps:

(*a*) Formation of the substrate
(*b*) Preparation of the substrate
(*c*) Application of terminations
(*d*) Preparation of resistor material
(*e*) Application of the resistor material
(*f*) Heat treatment of the resistor material
(*g*) Protection or stabilization of the resistor Capacitors, transistors, and diodes when adapted for miniaturization each require at least as many steps in the fabrication thereof. Unfortunately, many of the steps required are not compatible. A treatment that is desirable for the protection of a resistor may damage another element formed on the same substrate, such as a capacitor or transistor, and as the size of the complete circuit is reduced, such conflicting treatments, or interactions, become of increasing importance. Interactions may be minimized by forming the components separately and then assembling them into a complete package, but the very act of assembly may cause damage to the more sensitive components.

Because of the large number of operations required, control over miniaturized circuit fabrication becomes very difficult. To illustrate, many raw materials must be evaluated and controlled, even though they may not be well understood. Further, many testing operations are required and, even though a high yield may be obtained for each operation, so many operations are required that the over-all yield is often quite low. In service, the reliability of a circuit produced by methods of such complexity may also be quite low due to the tremendous number of controls required. Additionally, the separate formation of individual components requires individual terminations for each component. These terminations may eventually become as small as a dot of conductive paint. However, they still account for a large fraction of the usable area or volume of the circuit, and may become an additional cause of circuit failure or rejection due to misalignment.

In contrast to the approaches to miniaturization that have been made in the past, the present invention has resulted from a new and totally different concept for miniaturization. This concept and circuit elements made in accordance with this concept are the subject matter of a pending application, Serial No. 791,602, filed February 6, 1959, by the same inventor, and assigned to the same assignee as this application. Radically departing from the teachings of the art, it is proposed in that pending application that miniaturization can best be attained by use of as few materials and operations as possible. In accordance with the principles of that invention, the ultimate in circuit miniaturization is attained using only one material for all circuit elements and a limited number of compatible process steps for the production thereof.

The above is accomplished by utilizing a body of semiconductor material exhibiting one type of conductivity, either N-type or P-type, and having formed therein a diffused region or regions of appropriate conductivity type to form a P-N junction between such region or regions and the remainder of the semiconductor body or, as the case may be, between diffused regions. It is, of course, understood that the P-N junction may be formed by other well known methods, even though diffused junctions are utilized in the preferred embodiment of this invention. According to the principles of this invention, all components of a diode "AND" gate are fabricated within the body so characterized by adapting the novel techniques described in said pending application, together with certain new techniques. It is to be noted that all components of the circuit are integrated into the body of semiconductor material and constitute portions thereof.

In a more specific conception of this invention, all components of a diode "AND" gate circuit are formed in or near one surface of a relatively thin semiconductor wafer characterized by a diffused P-N junction or junctions. Of importance to this invention is the concept of shaping. As described in detail in said pending application, this shaping concept makes it possible in a circuit to obtain the necessary isolation between components and to define the components or, stated differently, to limit the area which is utilized for a given component. Shaping may be accomplished in a given circuit in one or more of several different ways. These various ways include actual removal of portions of the semiconductor material, specialized configurations of the semiconductor material such as rectangular, L-shaped, U-shaped, etc., selective conversion of intrinsic semiconductor material by diffusion of impurities thereinto to provide low resistivity paths for current flow, and selective conversion of semiconductor material of one conductivity type to conductivity of the opposite type wherein the P-N junction thereby formed acts as a barrier to current flow. In any event, the effect of shaping is to direct and/or confine paths for current flow, thus permitting the fabrication of circuits which could not otherwise be obtained in a single wafer of semiconductor material. As a result, the final circuit is arranged in essentially planar form. It is possible to shape the wafer during processing and to produce by diffusion the various circuit elements in a desired and proper relationship.

Certain of the circuit components described in said pending application have utility in and of themselves; however, they perhaps find their greatest utility as integral parts of miniature semiconductor networks. Therefore, it is a principal object of this invention to provide a novel miniaturized semiconductor network which functions as a diode "AND" gate.

It is another principal object of this invention to provide a miniature semiconductor network diode "AND" gate fabricated from a body of semiconductor material containing a plurality of P-N junctions wherein all components of the diode gate are completely fabricated within the body of semiconductor material.

It is a further object of this invention to provide a unique miniaturized diode "AND" gate circuit structure which is substantially smaller, more compact, and simpler than circuit packages heretofore developed using known techniques.

Other and further objects of the present invention will become more readily apparent from the following detailed description of a preferred embodiment of the present invention when taken in conjunction with the appended drawings in which.

Figures 1, 2:
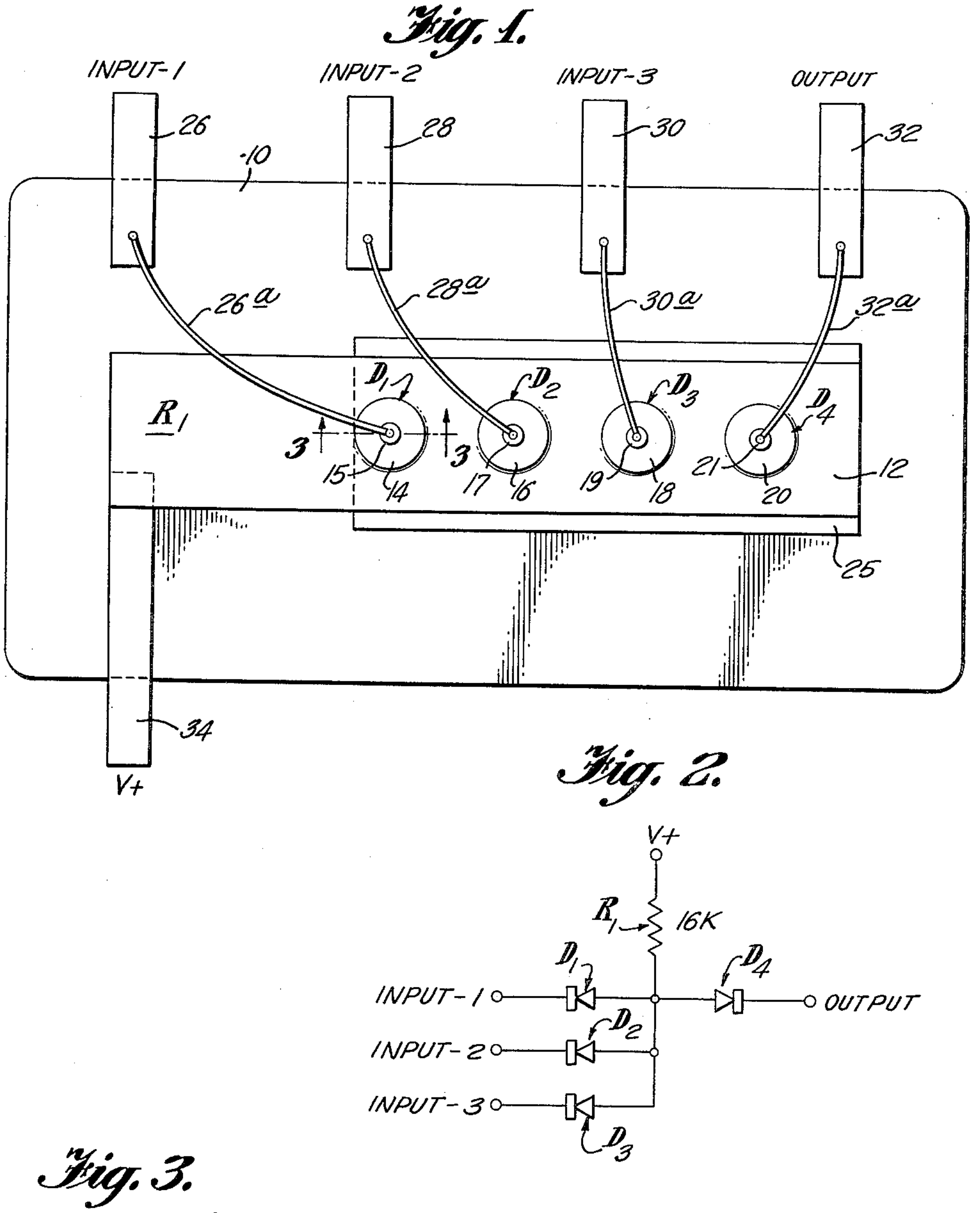
FIGURE 1 is a plan view of a miniature semiconductor network diode "AND" gate according to this invention.
FIGURE 2 is a schematic diagram of the semiconductor network illustrated in FIGURE 1.

Referring now to the drawings, a preferred embodiment of the present invention will be described in detail in order to provide a better understanding of the principles of this invention.

Figure 3:
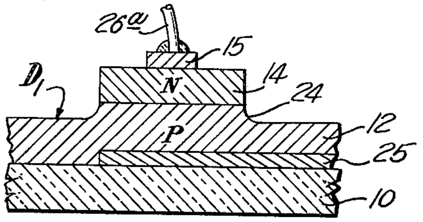
FIGURE 3 is a sectional view taken along lines 3—3 of FIGURE 1.

With reference to FIGURE 1, there is shown a ceramic substrate 10. A strip 12 of semiconductor material, preferably a silicon or germanium wafer of P-type conductivity, is attached to the substrate 10. Regions 14, 16, 18, and 20 of N-type semiconductor material have been produced in the right-hand portion of strip 12 to form integral P-N junction diodes $D_1$, $D_2$, $D_3$, and $D_4$. These regions 14, 16, 18, and 20 may be produced, for example, by the method disclosed in the above-mentioned pending application. Ohmic contacts 15, 17, 19, and 21, which may be plated or alloyed contacts, are provided on each of the N-type regions. In FIGURE 3, there is illustrated a cross sectional view of the typical junction diode $D_1$ to show the various layers. In forming these junctions, the semiconductor strip may be first subjected to diffusion of a N-type significant impurity material over its entire surface. Then, the N-type semiconductor material may be etched away except in the regions in which the junctions are required. This process forms a raised mesa 24 on each area of the strip 12 in which a junction is desired.

Returning now to FIGURE 1, three input leads 26, 28, and 30, an output lead 32 and a bias lead 34 are attached to substrate 10. Bias lead 34, also attached to the substrate, passes beneath the left-hand end of semiconductor strip 12, and is placed in ohmic contact therewith, as by soldering. Wire leads **26*a*, 28*a*, 30*a*, and 32*a* are connected between their corresponding input and output leads 26, 28, 30, and 32 and junction diode ohmic contacts 15, 17, 19, and 21, respectively. The left-hand portion of strip 12 is shaped to define a resistor $R_1$ having a desired value, which in one embodiment of the circuit of the present invention may be 16 k., between the point of ohmic contact by bias lead 34 and the juncture with the anode of the junction diode $D_1$. The shaping of resistor $R_1$ is accomplished by etching or other means to provide a required length and cross sectional area of the left-hand portion of the strip 12 necessary for that strip to exhibit the required resistance, taking into consideration the resistivity of the material of the strip 12. A posiive potential, V+, which may be, for example, 12 volts, is applied to lead 34. A thin strip of conducting material 25 is attached to the substrate 10 beneath the semiconductor strip 12, which is in ohmic contact therewith. In this manner, all diode anodes are maintained at approximately the same potential inasmuch as the resistance in the strip 12 of semiconductor material beneath the diodes is effectively shorted out by the conductive strip 25. Alternatively, the same result may be accomplished by forming a suitable region of conducting material on the lower side of strip 12**, using well known methods.

The miniature semiconductive device of FIGURE 1 is represented schematically by the circuit diagram shown in FIGURE 2. Corresponding elements in FIGURES 1 and 2 have been designated with the same reference numerals. The circuit operation is conventional, and may be easily understood by reference to FIGURE 2. The circuit functions to perform a logical "AND" operation. When simultaneous positive pulses of sufficient amplitude to back bias the diodes $D_1$, $D_2$, and $D_3$ are applied to the three input leads in opposition to the forward bias provided by the positive potential V+ applied through bias resistor $R_1$, current will no longer flow through $R_1$. The full V+ voltage is then applied to $D_4$ to forward bias it and provide a positive pulse to output lead 32, indicating coincidence of three inputs. If one or more of the diodes $D_1$, $D_2$, and $D_3$ remain forward biased, i.e., do not receive a positive pulse from their inputs, current continues to flow through $R_1$ to suppress the bias voltage applied to $D_4$. It is, of course, to be understood that a circuit with two inputs or four or more, rather than only three as shown in FIGURES 1 and 2, or a circuit which does not utilize the output diode $D_4$, could easily be fabricated by utilizing the principles of this invention and such variations are within the contemplated scope of this invention.

It must be emphasized here that only one preferred embodiment of this invention has been described above and that other variations and modifications thereof may be made without departing from the scope of this invention which is defined in the appended claims.

What is claimed is:

1. A semiconductor network comprising a wafer of semiconductor material, an elongated region of one conductivity-type defined in said wafer, at least three surface portions of the opposite conductivity-type defined in said wafer adjacent a major face thereof, said portions being spaced from one another and contiguous to said region adjacent one end thereof, a conductive plating adherent to said region adjacent said one end and adjacent said portions, said plating being effective to lower the apparent resistance of said region in the area of said portions, conductive means on said major face making ohmic contact to each of said portions individually, and a nonrectifying contact connected to said region on said major face adjacent the opposite end thereof, the resistance of the path through said region from said contact to said portions being much greater than the resistance between the portions whereby an output resistor is provided by said path.

2. A miniature solid state semiconductor circuit device for providing a logical function comprising an insulating substrate, a strip of single crystal semiconductor material of one type conductivity mounted on said substrate, said strip having first and second strip portions, four longitudinally spaced layer regions of diffused opposite type semiconductor material in said first strip portion for defining therein four p-n junction diodes, said second strip portion defining a bias resistor extending from one end thereof to its juncture with said first strip portion, an input lead connected to each of three of said layer regions, an output lead connected to the other of said layer regions, conductive means adherent to said first strip portion making low resistance ohmic connection to the semiconductor material of said one conductivity type of all of said diodes, a bias lead connected to said one end of said second strip portion for applying a relatively low forward bias voltage to said diodes in said first strip portion, means for applying signals to said input leads to reverse bias said three diodes so that when said three diodes are simultaneously reverse biased a relatively high forward bias is applied from said bias lead to said other diode to cause a relatively high voltage to appear on said output lead, thereby providing an AND logical function.

3. A semiconductor integrated circuit comprising a wafer of monocrystalline semiconductor material, a plurality of regions of semiconductor material defined in the wafer adjacent one major face thereof, each region occupying only a limited part of the total area of said one major face, each region being composed of semiconductor material of conductivity type opposite to that of the zone immediately underlying such region so that a P-N junction separates each such region from the remainder of the wafer, the regions being spaced and separated from one another along said one major face, an elongated resistor portion defined in the wafer to provide a resistive current path generally parallel to said one major face, the resistor portion being spaced from the regions for at least the major part of its length, conductive means secured to a major face of the wafer electrically connected to one end of the resistor portion and to the zones of semiconductor material underlying the regions thereby providing low resistance connection between such zones, a plurality of contacts with each contact separately engaging a different one of said regions on said one major face, and a contact on a major face of the wafer engaging the other end of the resistor portion.

References Cited in the file of this patent

UNITED STATES PATENTS

| | | |
|---|---|---|
| 2,502,479 | Pearson et al. | Apr. 4, 1950 |
| 2,623,105 | Shockley et al. | Dec. 23, 1952 |
| 2,655,625 | Burton | Oct. 13, 1953 |
| 2,662,957 | Eisler | Dec. 15, 1953 |
| 2,663,806 | Darlington | Dec. 22, 1953 |
| 2,666,814 | Shockley | Jan. 14, 1954 |
| 2,667,607 | Robinson | Jan. 26, 1954 |
| 2,770,740 | Reeves et al. | Nov. 13, 1956 |

OTHER REFERENCES

Joel: "Electronics in Telephone Switching Systems," published in the Bell System Technical Journal, volume 35, pages 991–1018, September 1956.